United States Patent Office 3,810,943
Patented May 14, 1974

3,810,943
CYCLOPENTANE DIALDEHYDES
Geraint Jones, Macclesfield, England, and Ralph Alexander Raphael, Glasgow, Scotland, assignors to Imperial Chemical Industries Limited, London, England
No Drawing. Filed Dec. 13, 1971, Ser. No. 207,531
Claims priority, application Great Britain, Jan. 6, 1971, 662/71
Int. Cl. C07c 47/52
U.S. Cl. 260—600     3 Claims

ABSTRACT OF THE DISCLOSURE

The invention relates to a novel process for the manufacture of a prostaglandin or a prostaglandin-like compound which comprises the oxidative cleavage of a bicyclo-[2,2,1]heptene derivative to a cyclopentane dialdehyde, which is converted to a prostaglandin or a prostaglandin-like compound by conventional means, and also relates to the novel bicyclo[2,2,1]heptene derivatives and cyclopentane dialdehydes used in the above process.

---

This invention relates to a novel process for the manufacture of prostaglandins of the E and F series and of certain synthetic analogues thereof, and to certain key intermediate compounds used in the process.

Although prostaglandins $E_1$ and $F_{1\alpha}$ have been known to possess a wide range of valuable pharmacological properties since at least 1958, and prostaglandins $E_2$ and $F_{2\alpha}$ since at least 1962, none of these prostaglandins has heretofore been available in commercial quantities. The abovementioned prostaglandins have been isolated from natural sources, for example from sheep prostate glands, but the supply of such organs is limited, and their prostaglandin content is very low. Syntheses of natural prostaglandins and of various synthetic analogues have been developed, but none has so far made these compounds available in commercial quantities, possibly because of either the inaccessibility of the starting materials, the number of synthetic steps required to elaborate the prostaglandin molecule from the starting material, the low yields produced in some of the intermediate steps, or the low temperatures which are difficult to obtain in large scale production, but which are required for some of the reaction steps.

Thus, one synthesis requires as a first step the reaction of cyclopentadienyl sodium with chloromethyl methyl ether at a temperature of about $-55°$ C. to give 5-methoxymethylcyclopenta-1,3-diene, so that, although the subsequent steps in the synthesis all proceed in acceptable yield, the overall synthesis is not suitable for large scale commercial manufacture of prostaglandins.

We have now discovered, and herein lies our invention, that certain of the later intermediates used in the abovementioned synthesis may be obtained from readily available starting materials without recourse to very low temperature reaction conditions, and the basis of our invention lies in the oxidative cleavage of a 5,6-disubstituted norborn-2-ene to give a tetrasubstituted cyclopentane derivative, wherein each of the four substituents may be readily modified by conventional means to give one of the intermediates used in the above-mentioned synthesis.

In this specification the term "oxidative cleavage" is to be taken to mean any known process whereby a carbon-carbon double-bond is split and which involves the use of at least one oxidizing agent. Thus, examples of oxidative cleavage are: the reaction of an olefin with ozone followed by decomposition of the ozonide so formed; and reaction of an olefin with a hydroxylating agent such as, for example, osmium tetroxide or potassium permanganate to give a 1,2-diol which is split with sodium periodate, periodic acid, lead tetra-acetate or a cobaltous salt, for example cobaltous acetate. It is to be understood of course that in such an oxidative cleavage the intermediate oxygen-containing adducts may, or may not, be isolated as such.

In this specification also, the term "a prostaglandin or a prostaglandin-like compound" is to be taken as referring to known compounds of the general formula:

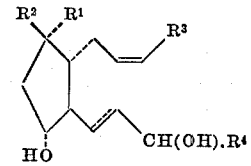

wherein $R^1$ is a hydroxy radical and $R^2$ is a hydrogen atom, or $R^1$ and $R^2$ together form the oxo radical, $R^3$ is a hydrocarbon chain optionally bearing one or more substituents and containing a carboxy, alkoxycarbonyl or hydroxymethyl radical, and $R^4$ is a group of predominantly hydrocarbon character.

Thus, according to the invention there is provided a process for the manufacture of a prostaglandin or a prostaglandin-like compound which includes the oxidative cleavage of a bicyclo[2,2,1]heptene derivative of the formula:

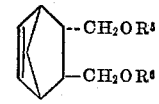

wherein $R^5$ and $R^6$, which may be the same or different, are alkyl radicals of up to 6 carbon atoms or aralkyl radicals of up to 20 carbon atoms.

Suitable values for $R^5$ and $R^6$ are, for example, methyl, ethyl, benzyl and triphenylmethyl radicals.

The oxidative cleavage may be carried out in a diluent or solvent, for example dioxan for the hydroxylation with osmium tetroxide, aqueous dioxan for the oxidation reaction with sodium periodate, or methanol for the ozonolysis, and they may be carried out at ambient or an elevated temperature, but preferably between about 20 and 30° C.

A particular group of prostaglandins and prostaglandin-like compounds which may be manufactured by the process of the invention comprises compounds of the formula I wherein $R^1$ is a hydroxy radical and $R^2$ is a hydrogen atom, or $R^1$ and $R^2$ together form the oxo radical, $R^3$ is an ω-carboxyalkyl radical of 2 to 6 carbon atoms, optionally substituted by up to three fluorine atoms, and $R^4$ is an alkyl radical of 1 to 8 carbon atoms, optionally substituted by up to 3 fluorine atoms.

Particular compounds of formula I which may be manufactured by the process of the invention are prostaglandin $F_{2\alpha}$ of the formula I wherein $R^1$ is a hydroxy radical, $R^2$ is a hydrogen atom, $R^3$ is a 3-carboxypropyl radical and $R^4$ is a n-pentyl radical, and prostaglandin $E_2$ of the formula I wherein $R^1$ and $R^2$ together form the oxo radical and $R^3$ and $R^4$ have the meanings stated immediately above.

The bicyclo[2,21]heptene derivative used as starting material for the above reaction may be obtained from methyl 6 - dimethoxymethylbicyclo[2,2,1]hept - 2-ene-5-carboxylate by reduction with lithium aluminium hydride in ether to give 6-dimethoxymethyl-5-hydroxymethylbicyclo[2,2,1]hept-2-ene, which is reacted with an alkyl or aralkyl halide of the formula $R^5$-halogen wherein $R^5$ has the meaning stated above. The acetal grouping is converted to an aldehyde by hydrolysis with dilute mineral acid, and the aldehyde is reduced to the corresponding 6-hydroxymethyl compound, which is reacted with an alkyl or aralkyl halide of the formula $R^6$-halogen, wherein $R^6$ has the meaning stated above. Alternatively, if $R^5$ and $R^6$ are the same the sequence of reactions is modified so that only one etherification reaction is necessary.

The product from the oxidative cleavage described above is a dialdehyde of the formula:

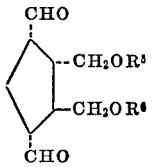
III wherein $R^5$ and $R^6$ have the meanings stated above, and such a compound may be converted into a known prostaglandin intermediate by number of alternative sequences of reactions involving the conventional reactions of organic chemistry.

Thus, for example, a dialdehyde of the formula III above wherein $R^5$ is a benzyl radical and $R^6$ is a methyl radical is converted to the known prostaglandin intermediate of the formula:

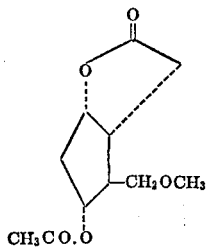
IV by reaction with methyl-lithium, followed by oxidation with chromic acid in acetone to give the corresponding di(methyl ketone), and a Baeyer-Villiger oxidation with peroxytrifluoroacetic acid gives the diacetoxy compound. The benzyl ether grouping is hydrogenolysed, and the resulting alcohol is converted to its toluene-p-sulphonyl ester which is reacted with sodium cyanide to give the corresponding cyanomethyl compound. Deacetylation with potassim carbonate, hydrolysis of the nitrile group to a carboxylic acid which rapidly lactonizes, and reacetylation of the remaining hydroxyl group gives the required known prostaglandin intermediate.

Alternatively, a dialdehyde of the formula III wherein $R^5$ and $R^6$ are each a benzyl radical is converted to a known prostaglandin intermediate of the formula:

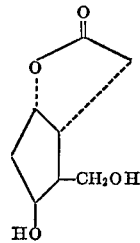
V by conversion to the corresponding diacetoxy compound in the manner described above, and hydrogenolysis of the two benzyl groups, followed by acetyl group migration, from that acetoxy radical which is in a cis-relationship to the adjacent hydroxymethyl radical, to give a compound of the formula:

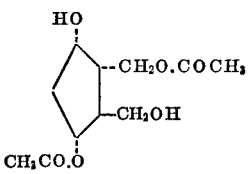
VI

The hydroxymethyl radical is converted into a triphenylmethoxymethyl radical, and the resultant compound is deacetylated. Reaction with toluene-p-sulfonyl chloride followed by sodium cyanide gives the cyanomethyl compound, and the two hydroxy radicals are acetylated to give a compound of the formula:

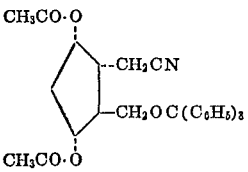
VII

The triphenylmethyl ether is cleaved, the cleavage product is deacetylated with potassium carbonate in methanol, and the nitrile is hydrolyzed, the acid produced lactonizing under the conditions of the reaction to give the lactone V.

The known prostaglandin intermediates are converted into known prostaglandins or prostaglandin analogues by known methods.

Certain of the intermediates used in the above reaction sequence are novel compounds. Thus, according to a further feature of the invention there is provided a bicyclo [2,2,1]heptane derivative of the formula:

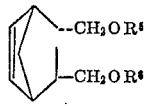
II wherein $R^5$ and $R^6$ have the meanings stated above.

Suitable values for $R^5$ and $R^6$ are those stated above.

Preferred compounds of formula II above are 5-endo-benzyloxymethyl - 6 - exo - methoxymethylbicyclo[2,2,1] hept - 2 - ene and 5-endo-6-exo-bisbenzyloxymethylbicyclo [2,2,1]hept-2-ene.

Compounds of the formula II wherein $R^5$ and $R^6$ are the same may be prepared by reacting cyclopentadiene with an ester of fumaric acid in a Diels-Alder reaction, reducing the ester groups to hydroxymethyl radicals with lithium aluminum hydride and reacting the resulting dialcohol with an appropriate alkyl or aralkyl halide.

Compounds of the formula II wherein $R^5$ and $R^6$ are different, for example wherein $R^5$ is a benzyl radical and $R^6$ is a methyl radical, may be obtained from methyl 6-dimethoxymethylbicyclo[2,2,1]hept - 2 - ene - 5 - carboxylate by reduction of the methyl ester with lithium aluminium hydride followed by benzylation of the resulting alcohol, hydrolysis of the acetal, and lithium aluminium hydride reduction of the resulting aldehyde to an alcohol which is methylated with methyl iodide.

According to a further feature of the invention, there is provided a cyclopentane derivative of the formula:

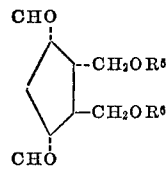
III wherein $R^5$ and $R^6$ have the meanings stated above.

Suitable values for $R^5$ and $R^6$ are those stated above.

Preferred compounds of the formula III above are 2α-benzyloxymethyl-3β-methoxymethylcyclopentane - 1α,4α-dicarboxaldehyde and 2α,3β-bisbenzyloxymethylcyclopentane-1α,4α-dicarboxaldehyde.

According to a further feature of the invention there is provided a process for the manufacture of compounds of the formula III above, which comprises the oxidative cleavage of a bicyclo[2,2,1]heptene derivative of the formula:

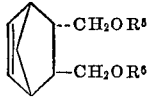
II wherein $R^5$ and $R^6$ have the meanings stated above.

Suitable values for $R^5$ and $R^6$ are those stated above, and suitable reaction conditions are those stated above.

The invention is illustrated, but not limited by the following examples:

EXAMPLE 1

A solution of 5-endo-benzyloxymethyl-6-exo-hydroxymethylbicyclo[2,2,1]hept - 2 - ene (72.2 g.) in 1,2-dimethoxyethane (50 ml.) is added to a stirred suspension of oil-free sodium hydride (26.7 g.) in 1,2-dimethoxyethane (600 ml.) under a nitrogen atmosphere. The mixture is stirred for 1 hour at room temperature and methyl iodide (93 ml.) is added dropwise. After the heat of the reaction has been dissipated, water is added cautiously to the reaction mixture, and the product is extracted with four portions of ether. The combined ether extracts are washed with brine, dried and evaporated, and the residue is distilled to give 5-endo-benzyloxymethyl - 6 - exo-methoxymethylbicyclo[2,2,1]hept - 2 - ene, B.P. 112–116° C./0.05 mm.

The starting material used in the above process may be obtained as follows:

A solution of methyl 6-exo-dimethoxymethylbicyclo[2,2,1]hept-2-ene-5-endo-carboxylate (39.5 g.) in ether (150 ml.) is added slowly to a stirred suspension of lithium aluminium hydride (10 g.) in ether (2 l.). After the addition the reaction mixture is stirred for 1 hour, and a saturated solution of ammonium chloride is added until a granular precipitate forms. The mixture is filtered and the filtrate is dried and evaporated. The residue is chromatographed on Florisil to give the corresponding alcohol. A sample redistilled for analysis had M.P. 98° C./0.6 mm.

A solution of the alcohol (31.2 g.) in 1,2-dimethoxyethane (50 ml.) is added to a suspension of oil-free sodium hydride (10.2 g.) in 1,2-dimethoxyethane (250 ml.) under a nitrogen atmosphere. The mixture is stirred for 1 hour at room temperature, benzyl bromide (28.4 g.) is added and the mixture is heated under reflux for 16 hours. The mixture is cooled, 10% aqueous sodium carbonate solution (50 ml.) is added cautiously and the product is extracted with 4 portions of ether. The combined ether extracts are washed twice with water, dried and evaporated. The residue is distilled to give the corresponding benzyl ether, B.P. 155–158° C./0.05 mm.

A solution of the benzyl ether (84.4 g.) in dioxan (1 l.) is treated with a solution of concentrated sulphuric acid (9 ml.) in water (650 ml.) and the mixture is heated at 100° C. for 1 hour. The mixture is cooled and neutralized with 15% aqueous sodium carbonate solution, and the product is extracted with 4 portions of ether. The combined ether extracts are washed with brine, dried and evaporated to give the benzyl ether aldehyde which is used immediately in the next stage without further purification.

A solution of the ether aldehyde (75 g.) in ether (50 ml.) is added dropwise to a stirred suspension of lithium aluminum hydride (5 g.) in ether (1 l.). After the addition the mixture is stirred for ½ hour and allowed to stand overnight, and a saturated solution of ammonium chloride is added slowly until a granular precipitate separates. The mixture is filtered and the filtrate is washed with brine, dried and evaporated to give 5-endo-benzyloxymethyl-6-exohydroxymethylbicyclo[2,2,1]hept-2-ene. An analytical sample has B.P. 155–160° C./0.1 mm.

EXAMPLE 2

Osmium tetroxide (2 g.) is added to a solution of 5-endo - benzyloxymethyl - 6 - exo-methoxymethylbicyclo-[2.2.1]hept-2-ene (25.8 g., prepared as described in Example 1) in dioxan (540 ml.). The solution is stirred in the dark for ¼ hour and diluted with distilled water (120 ml.), and to it is added a solution of sodium periodate (54 g.) in water (380 ml.) over 12 hours. The mixture is stirred overnight in the dark, filtered and the filter cake is washed with dry ether. The organic solvents are evaporated from the combined filtrate and washings, and the remaining aqueous solution is extracted with 4 portions of ether. The ether extracts are washed with brine, dried and evaporated to give 2α - benzyloxymethyl-3β-methoxymethylcyclopentane-1α,4α-dialdehyde, the infrared spectrum of which displays characteristic maxima at $\gamma_{max}$ 2720 and 1725 cm.$^{-1}$.

The dialdehyde is fully characterized by conversion to the corresponding diacetyl compound as follows:

The dialdehyde (28.0 g.) is added to methyl-lithium, prepared from lithium (8.4 g.) in ether solution and methyl bromide. After the addition, the mixture is stirred for 2 hours and 2 N hydrochloric acid (approximately 250 ml.) is added. The mixture is extracted with ether, and the extract is washed with brine, dried and evaporated.

A solution of the residue (29.0 g.) in acetone (500 ml.) is oxidized with Jones' reagent (chromic acid in acetone). Excess oxidizing agent is destroyed by adding isopropanol to the mixture, and the solvents are evaporated. The residue is extracted with ether, the extract is washed with brine, dried and evaporated, and the residue is distilled to give 1α,4α - diacetyl - 2α - benzyloxymethyl-3β-methoxymethylcyclopentane, B.P. 175–180° C./0.1 mm.

EXAMPLE 3

A solution of 5-endo-6-exo-bishydroxymethylbicyclo-[2,2,1]hept-2-ene (34.8 g.) is added dropwise to a suspension of oil-free sodium hydride (38.1 g.) in 1,2-dimethoxyethane (500 ml.) under an atmosphere of nitrogen, and the mixture is stirred for 1 hour at room temperature. Benzyl bromide (76.7 g.) is added and the mixture is heated under reflux on a steam-bath for 16 hours. Sodium carbonate (approximately 50 ml. of a 10% aqueous solution) is added slowly, and the mixture is extracted with 4 portions of ether. The ether solution is separated, washed with water (twice) and dried, the solvent is evaporated, and the residue is distilled under reduced pressure to give 5 - endo-6-exo-bisbenzyloxymethylbicyclo[2,2,1] hept-2-ene, B.P. 145–150° C./0.25 mm.

EXAMPLE 4

Osmium tetroxide (2 g.) is added to a solution of 5,6-bisbenzyloxymethylbicyclo[2,2,1]hept-2-ene, prepared as described in Example 3 (33.4 g.), in dioxan (540 ml.). The mixture is stirred for ¼ hour in the dark, and is then diluted with distilled water (120 ml.). To this solution is added over 12 hours a solution of sodium periodate (54 g.) in water (380 ml.). The mixture is stirred overnight, filtered and the filter cake is washed with ether. The filtrate is extracted with 4 portions of ether, the ether extracts are washed with brine, dried and the ether is evaporated to give 2α,3β-bisbenzyloxymethyl - 1α,4α - diformylcyclopentane, the infrared spectrum of which displays characteristic maxima at $\gamma_{max}$ 2620 and 1725 cm.$^{-1}$.

The dialdehyde is fully characterized by conversion, by the method described in the second part of Example 2, to the corresponding diacetyl compound which has the following characteristics:

infrared $\gamma_{max.}$=1715 cm.$^{-1}$ (C=O);
refractive index $n_{23}$=1.5416;
N.M.R. in deuteriochloroform (τ values):
    2.75, complex, 10H, aromatic
    5.57, doublet, 2H, —OCH$_2$Ph
    5.72, singlet, 2H, —OCH$_2$Ph
    6.52–6.80, complex, 4H, —CH$_2$OCH$_2$Ph
    6.80–8.3, complex, 6H, cyclopentane ring protons
    7.9, singlet, 6H, —COCH$_3$

EXAMPLE 5

1α,4α-diacetyl-2α-benzyloxymethyl - 3β - methoxymethylcyclopentane (26.0 g., prepared as described in the second part of Example 2) and disodium hydrogen phosphate (112.5 g.) are stirred in methylene chloride (500 ml.) while a mixture of trifluoroacetic anhydride (172 g.) and 90% hydrogen peroxide (21.4 ml.) in methylene chloride (300 ml.) is added at such a rate that the reaction mixture boils under reflux. After the addition the mixture is stirred for 2 hours, filtered and the filter cake washed with methylene chloride. The combined filtrate and washings are washed successively with 10% aqueous sodium carbonate and water, dried and evaporated. The residue is chromatographed on Florisil, and the fractions eluted with a mixture of 2 parts petroleum ether and 1 part ether give, after evaporation of the solvents, $1\alpha,4\alpha$-diacetoxy-$2\alpha$-benzyloxymethyl - $3\beta$ - methoxymethylcyclopentane, B.P. 175–180° C./0.2 mm.

A mixture of the diacetoxy compound (3.2 g.), 5% palladium on carbon (3.8 g.) and ethanol (50 ml.) is shaken with hydrogen at atmospheric pressure and room temperature for ½ hour. The catalyst is filtered off and washed with ethanol, and the filtrate is evaporated to give $1\alpha,4\alpha$-diacetoxy-$2\alpha$-hydroxymethyl - $3\beta$ - methoxymethylcyclopentane, 1.45 g. of which is dissolved immediately in pyridine (15 ml.) and treated with toluene-p-sulphonyl chloride (2.7 g.) for 3 days at 0° C. The reaction mixture is poured onto ice, and extracted with 4 portions of ether. The ether extract is washed with 50% hydrochloric acid and dried, and the solvents are evaporated to give a colorless toluene-p-sulphonate ester.

To a solution of the toluene-p-sulphonate (2.0 g.) in dimethylsulphoxide (10 ml.) is added finely powdered sodium cyanide (0.3 g.), and the mixture is heated at 100° C. for 10 hours. The reaction mixture is poured into brine, which is then extracted with ether. The ether extract is washed with brine and dried, and the solvent is evaporated. The residue is chromatographed on silica gel, and the fractions eluted with petroleum ether-ethyl acetate (3:1) give, after evaporation of the solvents, $1\alpha,4\alpha$-diacetoxy-$2\alpha$-cyanomethyl - $3\beta$ - methoxymethylcyclopentane, the infrared spectrum of which displays characteristic peaks at $\gamma_{max.}$ 2250 and 1735 cm.$^{-1}$.

The nitrile (156 mg.), finely ground anhydrous potassium carbonate (200 mg.) and absolute methanol (2.5 ml.) are stirred together at room temperature for ½ hour, N hydrochloric acid (3.0 ml.) is added, and the mixture is stirred for a further 5 minutes. The solvent is removed under high vacuum, and the residue is heated on a steam bath with concentrated hydrochloric acid (3 ml.) for 2 hours. The solvent is removed under high vacuum, and the residue is extracted with 4 portions of ethyl acetate. The extract is dried, the solvent is evaporated and the residue is purified by preparative thin-layer chromatography, to give a viscous oil having characteristic peaks in its infrared spectrum at $\gamma_{max.}$ 3400 and 1770 cm.$^{-1}$. The oil (47 mg.) is added to a mixture of acetic anhydride (0.25 ml.) and pyridine (0.25 ml.) and left at ambient temperature for 3 hours. The excess of reagents is evaporated under reduced pressure, and the residue is filtered through a short column of silica gel to give the lactone of $4\alpha$-acetoxy-$2\alpha$-carboxymethyl-$1\alpha$-hydroxy-$3\beta$-methoxymethylcyclopentane, identical by thin-layer chromatography, nuclear magnetic resonance and infrared spectroscopy with authentic material.

The lactone thus obtained is convertible to, for example, prostaglandin $E_2$ and prostaglandin $F_{2\alpha}$ by published procedures.

EXAMPLE 6

A solution of 5,6 - bisbenzyloxymethylbicyclo[2,2,1] hept-2-ene (16.7 g., prepared as described in Example 3) is cooled to −20° C., and ozone (2.4 g.) is bubbled into the solution while the temperature is gradually lowered to −40° C. The system is flushed with nitrogen, dimethylsulphide (5 ml.) is added, and the mixture is stirred below −10° C. for 1 hour, in an ice-bath for 1 hour and at room temperature for 1 hour. The solvent is evaporated and the residue is partitioned between ether and water. The ether solution is separated, and the ether is evaporated to give $2\alpha,3\beta$-bisbenzyloxymethyl-$1\alpha,4\alpha$-di- formylcyclopentane, identical by infrared spectroscopy with material prepared as described in Example 4.

EXAMPLE 7

$1\alpha,4\alpha$ - diacetyl-$2\alpha,3\beta$-bisbenzyloxymethylcyclopentane (35 g., prepared as described in the second part of Example 4), disodium hydrogen phosphate (112.5 g.) and methylene chloride (600 ml.) are stirred, and a mixture of trifluoroacetic anhydride (172 g.) and hydrogen peroxide (21.4 ml. of 90%) in methylene chloride (300 ml.) is added at such a rate as to maintain a steady reflux of the reaction mixture. After being stirred for 2 hours, the mixture is filtered, and the filter cake is washed with methylene chloride. The combined filtrate and washings are neutralized by washing with 10% aqueous sodium bicarbonate solution, are then washed with brine and dried, and the solvent is evaporated. The residue is chromatographed on Florisil, and the fractions eluted with a mixture of 2 parts by volume of petroleum ether and 1 part by volume of ether give, after evaporation of the solvents, $1\alpha,4\alpha$-diacetoxy-$2\alpha,3\beta$-bisbenzyloxymethylcyclopentane, the N.M.R. spectrum of which in deuteriochloroform shows the following characteristics ($\tau$ values):

2.75, complex, 10H, aromatic
4.75, complex, 1H, —C$\underline{H}$O·CO·CH$_3$
4.92, complex, 1H, —C$\underline{H}$O·CO·CH$_3$
5.65, multiplet, 4H, —C$\underline{H}_2$Ph
6.2–6.8, complex, 4H, —C$\underline{H}_2$OCH$_2$Ph
7.4–8.6, complex, 4H, cyclopentane ring protons
8.09, singlet, 6H, —O·COC$\underline{H}_3$ A mixture of the diacetoxy compound (35.4 g.), 5% palladium on carbon (35 g.) and ethanol (1 l.) is shaken with hydrogen at atmospheric pressure and room temperature for 1½ hours. The catalyst is filtered off and washed with ethanol, and the solvent is evaporated. The residue (18.3 g.) is dissolved in pyridine (24 ml.), the solution is heated under reflux for 16 hours, to give a mixture of $1\alpha,4\alpha$-diacetoxy-$2\alpha,3\beta$-bishydroxymethylcyclopentane and $4\alpha$ - acetoxy-$2\alpha$-acetoxymethyl-$3\beta$-hydroxymethyl-$1\alpha$-cyclopentanol in the ratio of approximately 60% of the former to 40% of the latter, as assessed by N.M.R. spectroscopy.

Tripheylmethyl chloride (26.9 g.) is added portionwise to the cooled pyridine solution of mixed diol diacetates, and the mixture is allowed to stand for 4 days at room temperature before being poured into ice water. The mixture is extracted with ethyl acetate (4× 200 ml.), the ethyl acetate extract is dried and the solvent is evaporated. The residue is chromatographed on Florisil. Elution with a mixture of petroleum ether (B.P. 40–60° C., 8 parts by volume) and ethyl acetate (1 part by volume) gives, after evaporation of the solvents, the unwanted $1\alpha,4\alpha$-diacetoxy - $2\alpha,3\beta$ - bis(triphenylmethoxymethyl)cyclopentane, M.P. 172–174° C. Subsequent elution with a mixture of 3 parts by volume of petroleum ether and 1 part by volume of ethyl acetate gives, after evaporation of the solvents, $4\alpha$-acetoxy-$2\alpha$-acetoxymethyl-$3\beta$-triphenylmethoxymethyl-$1\alpha$-cyclopentanol, M.P. 52–54° C.

$4\alpha$-acetoxy-$2\alpha$-acetoxymethyl - $3\beta$ - triphenylmethoxymethyl-$1\alpha$-cyclopentanol (9.7 g.), finely ground potassium carbonate (11.1 g.) and methanol (83 ml.) are mixed and stirred at room temperature for 2 hours. 1 N hydrochloric acid (166 ml.) is added, the mixture is stirred for 5 minutes and the solvents are evaporated under reduced pressure. The residue is extracted with ethyl acetate (4× 200 ml.), the extracts are dried and the solvent is evaporated to give $2\alpha$-hydroxymethyl-$3\beta$-triphenylmethoxymethylcyclopentane-$1\alpha,4\alpha$-diol.

A solution of the above compound (6 g.) in pyridine (120 ml.) is cooled to 0° C., treated with toluene-p-sulphonyl chloride (2.8 g.) and kept at 2° C. for 5 days. The reaction mixture is diluted with brine and extracted with ethyl acetate (4× 200 ml.). The combined extracts are dried, the solvent is evaporated, and final traces of pyridine are removed from the residue by azeotroping with benzene. Chromatography of the residue on Florisil, and elution with a mixture of petroleum ether (B.P. 40–60° C., 3 parts by volume) and ethyl acetate (1 part by volume) gives 2α - (toluene-p-sulphonylmethyl)-3β-triphenylmethoxymethylcyclopentane-1α,4α-diol as an oil.

Acetic anhydride (3.43 ml.) is added to a solution of the above compound (2.0 g.) in pyridine (1.45 ml.) the mixture is allowed to stand at room temperature for 3 days, and the solvents are evaporated under reduced pressure to give the corresponding 1α, 4α-diacetate.

To a solution of the diacetate (2.4 g.) in dimethyl formamide (15 ml.) is added sodium cyanide (1.0 g.) and a trace of sodium iodide, and the mixture is heated at 100° C. for 6 hours. The solvent is evaporated under reduced pressure, the residue is extracted with ethyl acetate, the extract is dried and the solvent is evaporated. The residue is chromatographed on Florisil, and the fractions eluted with a mixture of petroleum ether (B.P. 40–60° C., 4 parts by volume) and ethyl acetate (1 part by volume) give, on evaporation of the solvent, 1α,4α-diacetoxy-2α-cyanomethyl - 3β - triphenylmethoxymethylcyclopentane, the N.M.R. spectrum of which shows the following characteristic absorptions ($\tau$ values):

2.6–2.9, complex, 15H, aromatic
4.75–5.05, complex, 2H, —C$\underline{H}$·O·COCH$_3$
6.5–6.9, multiplet, 2H, —C$\underline{H}_2$·OCPh$_3$
7.4–8.3, complex, 6H, —C$\underline{H}_2$CN and cyclopentane protons
7.95–8.04, singlets, 6H, —O·COC$\underline{H}_3$ A solution of the nitrile (160 mg.) in 80% aqueous acetic acid is allowed to stand at room temperature for 24 hours. The mixture is filtered, and the filter cake of triphenylmethanol is washed with 80% aqueous acetic acid. The combined filtrate and washings are evaporated to dryness, and the residue (123 mg.) is dissolved in methanol (3 ml.) and treated with finely ground anhydrous potassium carbonate (158 mg.). The mixture is stirred at ambient temperature for 40 minutes, 1 N hydrochloric acid (2.25 ml.) is added, and the mixture is stirred for a further 5 minutes. The solvent is evaporated under reduced pressure, and the residue is extracted four times with ethyl acetate. The extract is dried, the solvent is evaporated and the residue is purified by thin layer chromatography to give the lactone of 2α-carboxymethyl-3β-hydroxymethylcyclopentane-1α,4α-diol, identical by thin layer chromatography, nuclear magnetic resonance spectroscopy and infrared spectroscopy with an authentic sample synthesized by the known literature route.

The lactone thus obtained is convertible to, for example, prostaglandin E$_2$ or prostaglandin F$_{2\alpha}$ by published procedures.

What we claim is:

1. A cyclopentane derivative of the formula:

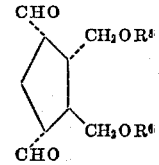

III wherein R$^5$ and R$^6$, which may be the same or different, are alkyl of up to 6 carbon atoms or aralkyl of up to 20 carbon atoms.

2. A cyclopentane derivative according to claim 1 wherein R$^5$ is benzyl and R$^6$ is methyl or benzyl.

3. A cyclopentane derivative according to claim 2 wherein R$^6$ is methyl.

References Cited
UNITED STATES PATENTS 3,637,721   1/1972   Pappas et al. _____ 260—598 X BERNARD HELFIN, Primary Examiner U.S. Cl. X.R.

260—611 F, 598, 611 A, 586 R, 617 R, 514 R, 468 R, 343.6, 464, 590, 488 R, 456 P, 386